Patented Jan. 24, 1939

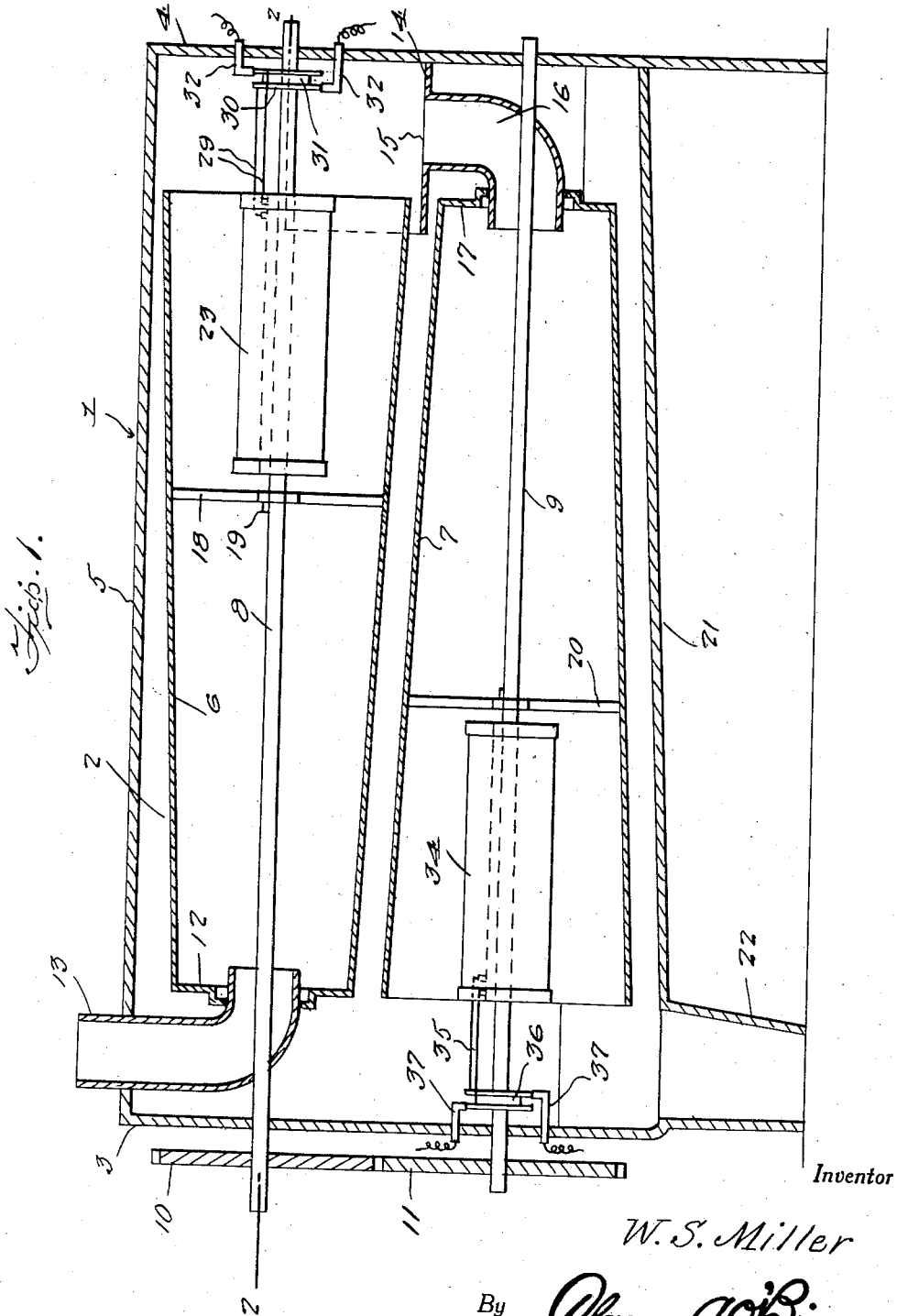

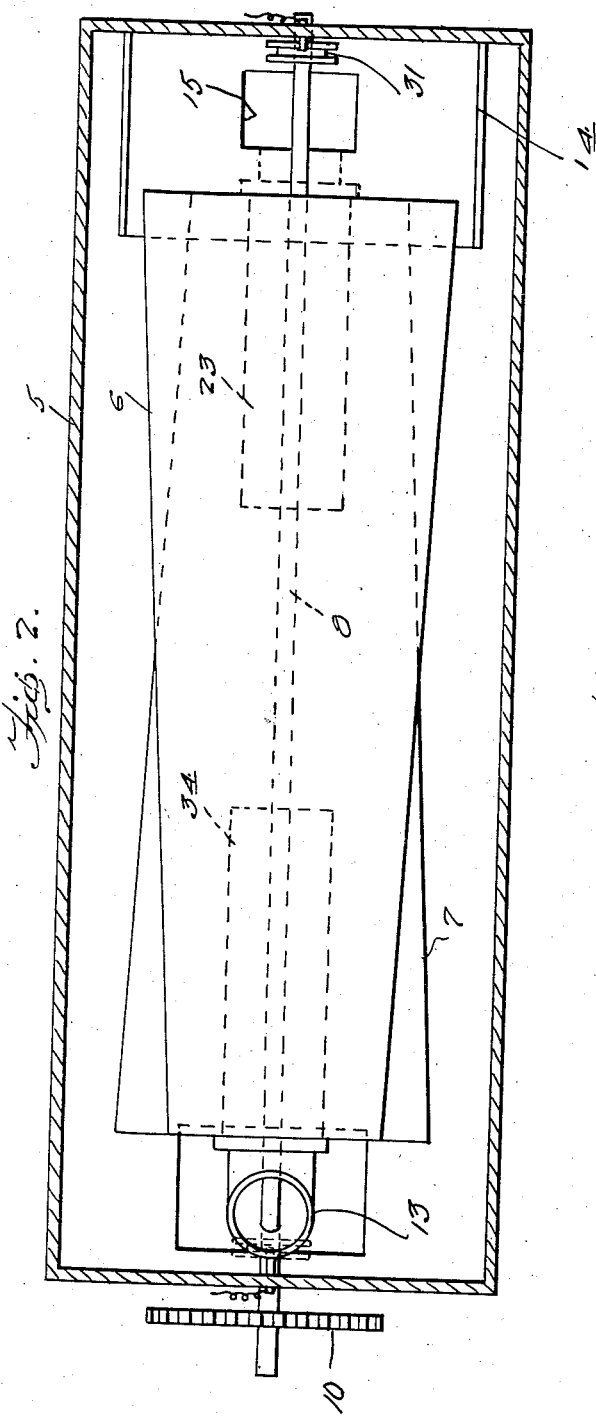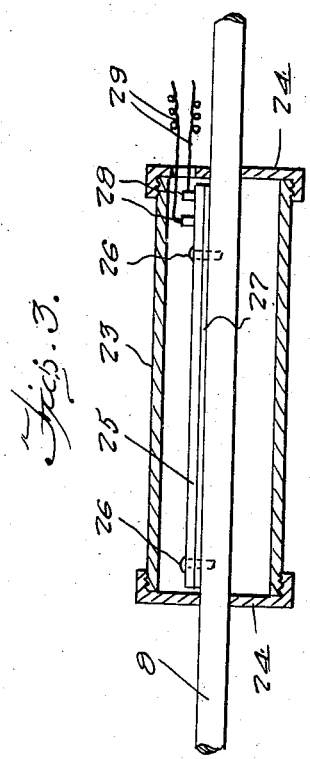

2,144,988

UNITED STATES PATENT OFFICE 2,144,988

FLOUR TREATING APPARATUS

William S. Miller, South Bend, Ind.

Application June 27, 1938, Serial No. 216,133

1 Claim. (Cl. 34—5)

My invention relates to apparatus for treating flour, and more particularly to drying and blending apparatus therefor.

The object of the invention is to provide an efficient apparatus of simple construction for rendering the coarsest of flour light and fluffy and reducing the same to extremely small particles.

Other and subordinate objects together with the precise nature of my improvements will be readily understood when the following description and appended claim are read with reference to the drawings accompanying and forming part of this specification.

In said drawings:

Figure 1 is a view in longitudinal vertical section of apparatus constructed in accordance with my invention, Figure 2 is a view in horizontal section taken on the line 2—2 of Figure 1 looking downwardly as indicated by the arrows, and Figure 3 is a view in longitudinal section of one of the heater units.

Referring to the drawings by numerals, the apparatus of my invention, in the illustrated embodiment thereof, comprises as its basic element, a substantially rectangular casing 1 of any suitable material including side walls 2, a front wall 3, rear wall 4 and a top 5.

In the casing 1 is a pair of elongated upper and lower spaced apart cylinders 6 and 7 extending lengthwise of the casing centrally thereof in a common plane and adapted to be rotated, in a manner presently described, by a pair of upper and lower shafts 8 and 9 extending axially through said cylinders, respectively, and suitably journaled adjacent their ends in the front and rear walls 3 and 4, the front ends of said shafts extending through the front wall 3 and being geared together by a pair of like gears 10 and 11 fast thereon respectively. The front and rear ends of the cylinders 6 and 7 are spaced from the front and rear walls 3 and 4 for a purpose presently seen, and said cylinders are correspondingly tapered but reversely, the upper one 6 forwardly and the lower one 7 rearwardly.

The front end of the upper cylinder 6 is closed by an annulus 12 journaled on the lower rearwardly turned end of an elbow-like feed pipe 13 extending upwardly through the top 5 of the casing 1 and suitably secured thereto if desired. The upper shaft 8 extends through said lower end of the feed pipe 13 and through the front side of the latter as best shown in Figure 1, the arrangement being such that the front end of said upper cylinder 6 rotates around said rear end of the feed pipe 13 and is supported concentrically of the upper shaft 8 by the feed pipe 13. The rear end of said upper cylinder 6 opens onto a transversely concave pan 14 extending forwardly from the rear wall 4 under said rear end of the cylinder 6 for a suitable distance and having a central discharge aperture 15 therein. The aperture 15 leads into an elbow-like discharge pipe 16 depending from said pan 14 and having the forwardly extending lower end through which, and the rear side of said pipe, the lower shaft 9 extends in the same manner as described with reference to shaft 8 and feed pipe 13. The rear end of the lower cylinder 7 is closed by an annulus 17 journaled on the forwardly extending end of the discharge pipe 16 whereby said cylinder 7 is supported concentrically of the shaft 9 in the same manner as described with reference to the front end of the cylinder 6.

The upper cylinder 6 is fixedly connected to the shaft 7 by a spider 18 therein spaced inwardly from the rear end of said cylinder and keyed to said shaft, as at 19, said spider supporting the rear end of the cylinder on said shaft as will be clear. The lower cylinder 7 is similarly secured to and supported on the lower shaft 9 by a spider 20 therein spaced inwardly from the front end of said cylinder.

Below the cylinder 7 is a transversely concave pan 21 extending from the rear wall 4 to the front wall 3 and inclining forwardly and downwardly to a discharge spout 22 depending from the front end thereof, said pan forming a closure or bottom for the casing 1 with the exception of said spout.

In the rear end of the upper cylinder 6 and supported by the shaft 8 concentrically thereof is an elongated dryer drum 23 of substantially smaller diameter than said end of the drum, said dryer having closed ends 24 fixed to said shaft in any suitable manner. Within the drum is an electric heating element of the resistant type in the form of a bar 25, of suitable material, secured to the shaft 8 lengthwise thereof by screws 26 of insulating material and also insulated from said shaft by a strip of insulating material 27. The bar 25 is provided with a pair of suitably arranged binding posts 28 for the connection thereto of a pair of leads 29 extending through the rear end 24 of the drum 23 and extending from opposite sides of the disk-like commutator 30 fast on the shaft 8 adjacent the rear wall 4, said commutator being suitably insulated from said shaft, and the sides thereof from each other, by means of a base central part 31 thereof formed of insulating material. A pair of brushes 32 are suitably mounted in the rear wall 4 to engage the opposite sides of the commutator 30 and for connection, as by leads 33, to a source of electrical energy, not shown.

In the front end of the lower cylinder 7 and on the shaft 9 is a dryer drum 34 fast on said shaft 9, the drum 34 having therein a heating element energized through the medium of leads 35, a commutator 36, and brushes 37, the latter mounted in the front wall 3, and the arrangement in this instance being the same as described with reference to the drum 23 and parts associated therewith.

As will be understood, the shafts 8 and 9 are rotated in opposite directions, through the medium of the gears 10 and 11 to one of which power is applied by any suitable means, said shafts rotating the cylinders 6 and 7 in opposite directions, also the dryer drums 23 and 34 and parts associated therewith. The flour may be fed into the feed pipe 13 by any suitable elevator, not shown, as desired.

As the flour enters the upper cylinder 6 it gravitates toward the rear larger end thereof and is carried up the sides of said cylinder by friction to drop onto the dryer drum 23, the heat from said drum removing all moisture from the flour. The dried flour then gravitates out of the upper cylinder 6 onto the pan 14. In this connection a suitable agitating screen may be provided in the pan 14 to sift the flour and strain out extraneous matter, but the use of the screen being optional, it has not been illustrated in the drawings. From the pan 14 the flour drops through the discharge pipe 16 into the lower cylinder 7 in which the same operation takes place as described with reference to the cylinder 6, the flour discharging from the front end of said cylinder 7 into the discharge spout 22. The manner in which the heating element in the dryer drums 23 and 34 are heated will be manifest without explanation. At suitable points, the sides 2 of the casing 1 may be provided with doors, not shown, for access to the interior of said casing as desired.

The foregoing constitutes a detailed description of a preferred embodiment of my invention and it is believed that the construction, operation and advantages will be readily understood therefrom.

Manifestly the invention as described, is susceptible of modification without departing from the inventive concept and right is herein reserved to such modifications as fall within the scope of the subjoined claim.

What I claim is:

In flour treating apparatus, a closed casing, a pair of upper and lower longitudinally disposed cylinders rotatably mounted in said casing in the center thereof in spaced apart relation, the upper cylinder tapering toward one end and the lower cylinder tapering toward its relatively opposite end, a pair of cylindrical elongated heating drums mounted in the larger ends of said cylinders, respectively, for rotation therewith axially thereof and smaller in diameter than said larger ends, an elbow feed pipe extending through the top of the casing into the small end of the upper cylinder and upon which said small end of the upper cylinder rotates, a pan in the casing extending beneath the larger end of the upper cylinder, a discharge pipe depending from said pan and extending into the smaller end of the lower cylinder, a discharge chute beneath the larger end of the lower cylinder, and means to heat said drums.

WILLIAM S. MILLER.